P. RABBIDGE.
ELECTRIC SECONDARY BATTERY.
APPLICATION FILED SEPT. 20, 1907.
985,368.
Patented Feb. 28, 1911.
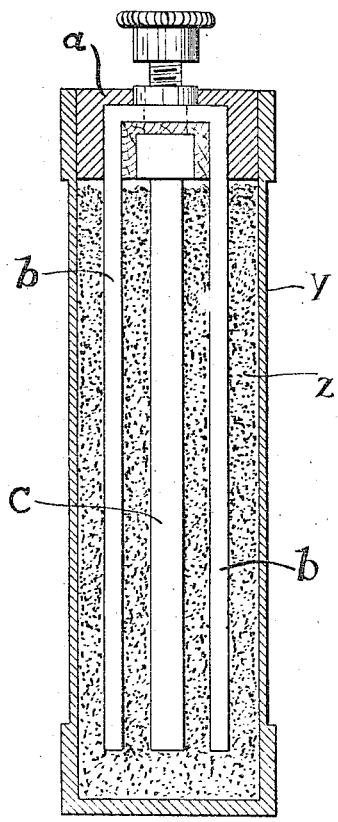

UNITED STATES PATENT OFFICE.

PARNELL RABBIDGE, OF NORTH SYDNEY, NEW SOUTH WALES, AUSTRALIA.

ELECTRIC SECONDARY BATTERY.

985,368. Specification of Letters Patent. Patented Feb. 28, 1911.

Application filed September 20, 1907. Serial No. 393,832.

*To all whom it may concern:*

Be it known that I, PARNELL RABBIDGE, a subject of the King of Great Britain, residing at Water's Road, Neutral Bay, North Sydney, in the State of New South Wales, Commonwealth of Australia, have invented an Improved Electric Secondary Battery, of which the following is a specification.

This invention is adapted to be applied to secondary and to dry primary batteries in their various forms, and is specially applicable for use on motor cars, trams, railways and other installations where the use of a liquid electrolyte has been proved to be detrimental, for various reasons.

In giving effect to the invention, an absorbent is used consisting of the residue from copra (the dried kernel of the cocoanut) from which the oil has been expressed. This residual copra is washed, dried, ground, and screened; it is then poured into the cell so that the pulverized material fills the spaces between and around the positive and the negative plates, and is well shaken, so that the pulverized material is brought into close contact with the plates; dilute sulfuric acid, sal ammoniac, caustic potash, or other suitable liquid electrolyte is then poured into the cell until the dry material is fully saturated with the liquid so that the combination of the dry and liquid materials forms a kind of paste; the cell may then be closed, and, if considered necessary, it may be sealed with wax or other suitable agent.

In the accompanying drawing in which is shown a vertical sectional view of a battery, $y$ indicates a receptacle of any suitable shape and material and having a suitable upper closure $a$, and $b$ and $c$ represent the positive and negative plates.

$z$ represents the pulverized absorbent which is saturated with an electrolyte and which, as shown, fills the space between the plates and also between the plates and the walls of the receptacle.

When the absorbent is applied to secondary cells, the latter may be moved about at will, and there will be no spilling of the electrolyte, which is one of the pregnant sources of damage with a liquid cell. The cell or battery may also be re-charged with electricity over and over again, and will be just as, or more, effective with the subsequent charges as it was with the first. Consequently, the adoption of the improved absorbent with secondary dry cells will entail much less expense than the use of an ordinary dry primary cell, because, when the latter has been exhausted, it is useless; it cannot be re-charged and must, therefore, be thrown away.

What I claim as my invention is:—

An absorbent for electric cells comprising suitably washed, screened and dried copra, treated with a liquid electrolyte.

In testimony whereof I have signed my name to this specification in the presence of two subscribing witnesses.

PARNELL RABBIDGE.

Witnesses:
 MANFIELD NEWTON,
 VINCENT NEWTON.